(12) United States Patent
Sakai et al.

(10) Patent No.: US 9,746,072 B2
(45) Date of Patent: Aug. 29, 2017

(54) OIL PRESSURE CONTROL DEVICE

(71) Applicant: DENSO CORPORATION, Kariya, Aichi-pref. (JP)

(72) Inventors: Akira Sakai, Kariya (JP); Fuminori Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/149,362

(22) Filed: May 9, 2016

(65) Prior Publication Data

US 2016/0334012 A1    Nov. 17, 2016

(30) Foreign Application Priority Data

May 11, 2015   (JP) .................................. 2015-96514

(51) Int. Cl.
| | | |
|---|---|---|
| *F16H 61/02* | (2006.01) | |
| *F16B 13/04* | (2006.01) | |
| *F16H 61/00* | (2006.01) | |
| *F16K 31/06* | (2006.01) | |
| *F15B 15/14* | (2006.01) | |
| *F15B 13/04* | (2006.01) | |

(52) U.S. Cl.
CPC ..... *F16H 61/0276* (2013.01); *F15B 13/0402* (2013.01); *F15B 15/14* (2013.01); *F16H 2061/0043* (2013.01); *F16H 2061/0279* (2013.01)

(58) Field of Classification Search
CPC ......... F16H 61/0276; F16H 2061/0043; F16H 2061/0279; F16H 61/0251
See application file for complete search history.

(56) References Cited

U.S. PATENT DOCUMENTS

| | | | |
|---|---|---|---|
| 5,971,889 A | 10/1999 | Ohashi et al. | |
| 7,853,360 B2* | 12/2010 | Kissler Fernandez | ......... G05D 16/2013 700/275 |
| 8,151,815 B2* | 4/2012 | Tabuchi | .............. F16H 61/0251 137/15.01 |
| 8,571,769 B2* | 10/2013 | Tarantini | ............. F16H 61/0251 251/129.01 |

* cited by examiner

*Primary Examiner* — Jacob S Scott
*Assistant Examiner* — Tinh Dang
(74) *Attorney, Agent, or Firm* — Nixon & Vanderhye P.C.

(57) ABSTRACT

An oil pressure control device controls a supply pressure of oil supplied to an oil pressure chamber of a friction element having a first engagement board and a second engagement board engaged with or disengaged from each other between a non-engagement state and a non-sliding engagement state via a sliding engagement state. The oil pressure control device includes: an electromagnetic valve that controls the supply pressure using a spool which reciprocates according to an energizing amount; and a control part that defines a first oscillatory wave part in which the energizing amount is controlled by making a first waveform with a first frequency to superimpose on a second waveform with a second frequency higher than the first frequency during a first period while the sliding engagement state and an instruction value of the supply pressure are kept constant.

6 Claims, 8 Drawing Sheets

OIL PRESSURE CONTROL DEVICE

CROSS REFERENCE TO RELATED APPLICATION

This application is based on Japanese Patent Application No. 2015-96514 filed on May 11, 2015, the disclosure of which is incorporated herein by reference in its entirety.

TECHNICAL FIELD

The present disclosure relates to an oil pressure control device.

BACKGROUND

A foreign substance such as metal powder may be mixed in operation oil that transfers a supply pressure to an automatic shift for a vehicle. If the foreign substance gets into a clearance between a spool of an electromagnetic valve and a sleeve which receives the spool to slide, the foreign substance affects the operation of the spool. JP H11-82724A (U.S. Pat. No. 5,971,889) describes an oil pressure control device in which a foreign substance is removed by reciprocating the spool.

However, the reciprocation cycle of the spool is very slow such as three seconds in the oil pressure control device. In case where the spool is operated with such a low frequency while the spool has a reciprocation amplitude sufficient for removing a foreign substance, the supply pressure may be varied by the movement of the spool. A removal of foreign substance may not be performed in the oil pressure control device when the internal-combustion engine is operated, in consideration of a gear shift shock (vibration), while a removal of foreign substance can be performed when the internal-combustion engine stops.

SUMMARY

It is an object of the present disclosure to provide an oil pressure control device in which a foreign substance is removed effectively while restricting variation in supply pressure such that a frequency and an amplitude of a spool reciprocation of an electromagnetic valve can be set within a wide range.

According to an aspect of the present disclosure, an oil pressure control device controls a supply pressure of oil supplied to an oil pressure chamber of a friction element of an automatic shift for a vehicle. The friction element has a piston that defines the oil pressure chamber and that is able to move by the supply pressure, a return spring that presses the piston against the supply pressure, and a first engagement board and a second engagement board engaged with or disengaged from each other by the piston between a non-engagement state and a non-sliding engagement state via a sliding engagement state.

The oil pressure control device includes an electromagnetic valve that controls the supply pressure using a spool which reciprocates according to an energizing amount, and a control part that controls the energizing amount based on an instruction value of the supply pressure.

The control part defines a first oscillatory wave part in which the energizing amount is controlled by superimposing a second waveform with a second frequency on a first waveform with a first frequency during a first period while the sliding engagement state and an instruction value of the supply pressure are kept constant. The second frequency is higher than the first frequency.

The first oscillatory wave part controls the spool to reciprocate with the first frequency and a first amplitude which are changeable according to a driving condition of the vehicle during the first period while the sliding engagement state and the instruction value of the supply pressure are kept constant.

Thereby, the first waveform can determine the frequency of the reciprocation of the spool, and the second waveform can control an amplitude of the energizing to the electromagnetic valve, i.e., an amplitude of the reciprocation of the spool. For this reason, it becomes possible to set the reciprocation amplitude of the spool relative to the reciprocation frequency of the spool. Accordingly, in the electromagnetic valve of the oil pressure control device, the selection range can be increased for the reciprocation frequency and the reciprocation amplitude of the spool. As a result, the reciprocation amplitude of the spool can be flexibly combined with various reciprocation frequencies of the spool which does not affect the supply pressure. Therefore, a foreign substance can be removed effectively while restricting the supply pressure from being varied.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (Embodiment)

Hereinafter, an embodiment will be described according to the drawings.

Figure 1:
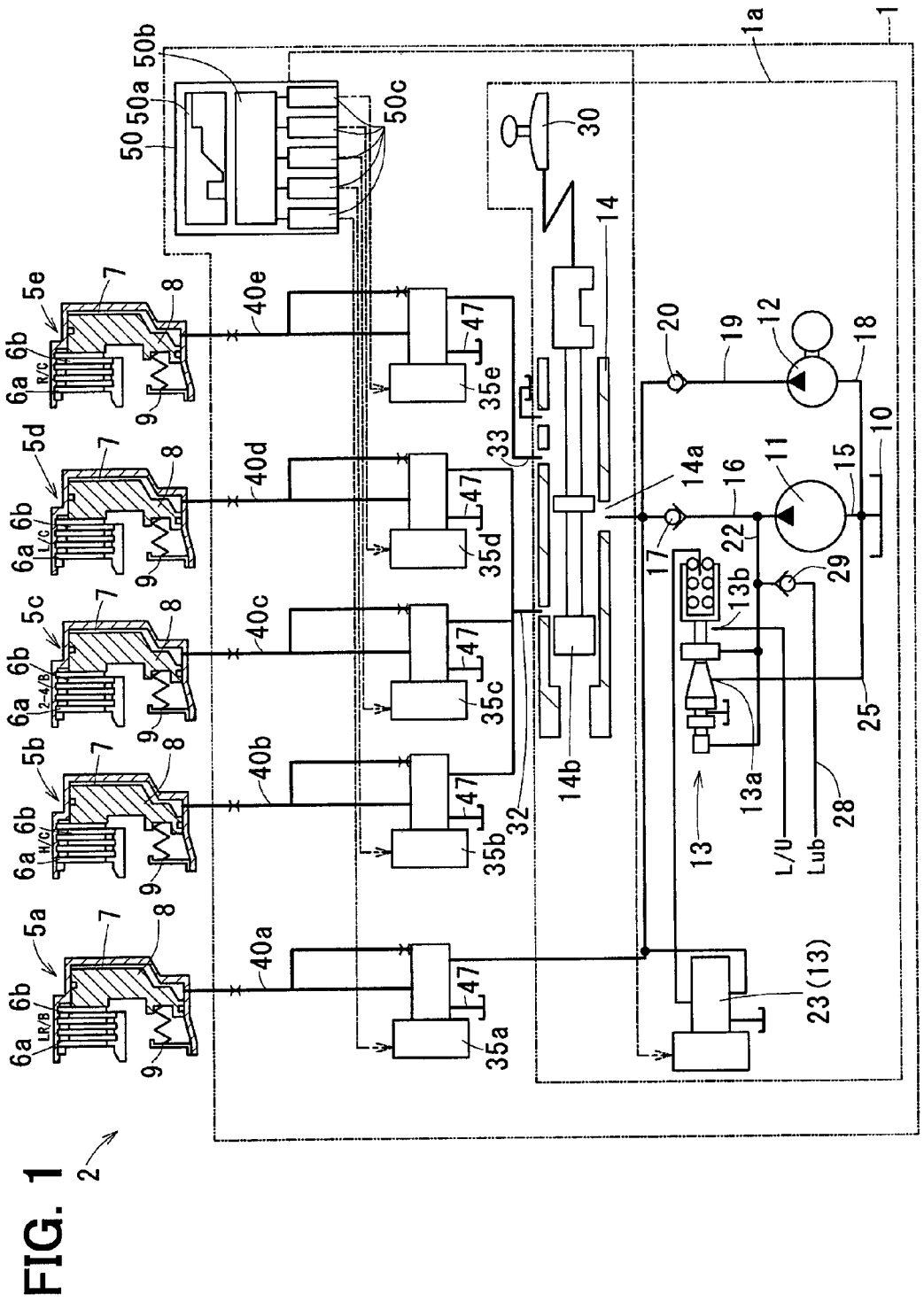
FIG. 1 is a view illustrating an automatic shift for a vehicle, which includes an oil pressure control device according to an embodiment.

An automatic shift 2 for a vehicle has an oil pressure control device 1 shown in FIG. 1. The oil pressure control device 1 controls friction elements 5a-5e of the automatic shift 2 by controlling a supply pressure supplied to the friction elements 5a-5e. An idling stop system is adopted for the vehicle having the automatic shift 2 to suspend an internal-combustion engine (not shown) when the shift position is in a forward drive range and when the speed of the vehicle is below a predetermined value.

The automatic shift 2 is a stepped transmission including a torque converter (not shown) connected with a crankshaft (not shown) of the internal-combustion engine, a planetary gear transmission mechanism (not shown), the friction elements 5a-5e and the oil pressure control device 1. The transmission mechanism has planetary gears (not shown). The friction element 5a-5e transmits the torque of rotation element such as sun gear, carrier gear, or ring gear of the planetary gear to other rotation element of the other planetary gear or a transmission case.

The friction element 5a-5e may be a wet multi-plate clutch or wet multi-disc brake having a first engagement board 6a and a second engagement board 6b. The automatic shift 2 controls the engagement state in the friction element 5a-5e by controlling the oil pressure supplied to an oil pressure chamber 7 of the friction element 5a-5e. For example, the first engagement board 6a and the second engagement board 6b are engaged with each other, or disengaged from each other. Thereby, the power channel between a turbine shaft (not shown) of the torque converter and an output shaft (not shown) is switched to achieve one of the shift positions.

The friction element 5a-5e has a piston 8 that defines the oil pressure chamber 7 and that is able to move by the supply pressure, and a return spring 9 that presses the piston 8 against the supply pressure. The first engagement board 6a and the second engagement board 6b are engaged with or disengaged from each other by the movement of the piston 8. When the first engagement board 6a and the second engagement board 6b are engaged with each other in the engagement state, torque transfers between the first engagement board 6a and the second engagement board 6b. When the first engagement board 6a and the second engagement board 6b are disengaged from each other in the non-engagement state (open state), the transfer of torque between the first engagement board 6a and the second engagement board 6b is intercepted. The engagement state has a non-sliding engagement state where there is no sliding and a sliding engagement state where there is a sliding. The first engagement board 6a and the second engagement board 6b alternately repeat the non-engagement state and the non-sliding engagement state through the sliding engagement state.

The oil pressure control device 1 has an oil pressure supplying device 1a for supplying oil pressure to each component of the automatic shift 2. The oil pressure supplying device 1a supplies operation oil pumped from an oil pan 10 to each oil pressure chamber 7 of the friction elements 5a-5e and the torque converter. The oil pressure supplying device 1a includes a mechanical pump 11, an electric pump 12, a line pressure control valve 13, and a manual valve 14.

The mechanical pump 11 is driven with rotation of the internal-combustion engine. The mechanical pump 11 draws operation oil stored in the oil pan 10 through an oil passage 15. The mechanical pump 11 pressurizes the operation oil drawn from an intake port connected to the oil passage 15, and discharges the pressurized operation oil to an oil passage 16 from a discharge port. The oil passage 16 connects the discharge port of the mechanical pump 11 to a feed port 14a of the manual valve 14. The operation oil discharged from the mechanical pump 11 passes along the oil passage 16, and is supplied to the feed port 14a of the manual valve 14. A check valve 17 disposed in the oil passage 16 permits the operation oil to flow from the mechanical pump 11 to the manual valve 14, and prohibits the operation oil from flowing from the manual valve 14 to the mechanical pump 11.

The electric pump 12 generates oil pressure, not depending on the internal-combustion engine, and is driven by an electric motor. The electric pump 12 draws the operation oil from the oil pan 10 through an oil passage 18. The electric pump 12 pressurizes the operation oil drawn from an intake port connected to the oil passage 18, and discharges the pressurized operation oil to an oil passage 19 from a discharge port. The oil passage 19 connects the discharge port of the electric pump 12 to the oil passage 16 at a position between the manual valve 14 and the check valve 17. The operation oil from the electric pump 12 is supplied to the feed port 14a of the manual valve 14 via the oil passage 19 and the oil passage 16. A check valve 20 disposed in the oil passage 19 permits the operation oil to flow into the manual valve 14 from the electric pump 12, and prohibits the operation oil from flowing from the manual valve 14 to the electric pump 12.

The line pressure control valve 13 is a pilot valve connected to a branch passage 22 branched from the oil passage 16 at a position between the mechanical pump 11 and the check valve 17. The line pressure control valve 13 adjusts the line pressure which is an oil pressure supplied to the manual valve 14. A spool of the line pressure control valve 13 moves to open or close a relief port 13a based on a balance among a biasing force of a spring, a force received from the operation oil of the branch passage 22, and an oil pressure that is controlled by an electromagnetic valve 23 according to the load of the automatic shift 2.

When the oil pressure from the mechanical pump 11 or the electric pump 12 is higher than the line pressure, excess operation oil is returned to the oil pan 10 through an oil passage 25 from the relief port 13a. The operation oil discharged from the relief port 13b of the line pressure control valve 13 is supplied to a lock-up circuit of the torque converter. A branch passage 28 is branched from the branch passage 22, and is connected to a lubricous part which supplies operation oil to each component as lubricating oil. A check valve 29 is disposed in the branch passage 28.

A selection bar 30 is operated by a driver of the vehicle among, for example, five operation positions such L, D, P, R and N ranges. L range is defined for a forward run to which the engine braking is given. D range is defined for a forward run. P range is defined for parking. R range is defined for a backward run. N range is defined for intercepting the power transfer. The spool 14b of the manual valve 14 is mechanically or electrically connected to the selection bar 30, and operates according to the operation position of the selection bar 30.

When the operation position of the selection bar 30 is in the D range, the manual valve 14 connects the oil passage 16 to the forward oil passage 32, and intercepts the oil passage 16 from the backward oil passage 33. At this time, the operation oil of the oil passage 16 or the oil passage 19 can be supplied to the electromagnetic valves 35b, 35c, 35d corresponding to the friction elements 5b, 5c, 5d through the forward oil passage 32. The friction elements 5b, 5c, 5d are forward friction elements to which oil pressure is supplied through the forward oil passage 32, and are related to a forward shift position.

When the operation position of the selection bar 30 is in the R range, the manual valve 14 connects the oil passage 16 to the backward oil passage 33, and intercepts the oil passage 16 from the forward oil passage 32. At this time, the operation oil of the oil passage 16 or the oil passage 19 is supplied to the electromagnetic valve 35e corresponding to the friction element 5e through the backward oil passage 33.

The friction element 5e is a backward friction element to which oil pressure is supplied through the backward oil passage 33.

When the operation position of the selection bar 30 is in the P range or the N range, the manual valve 14 intercepts the forward oil passage 32 and the backward oil passage 33 from the oil passage 16. Operation oil is directly supplied from the oil passage 16 to the friction element 5a without the manual valve 14. The friction element 5a is a wet multi-disc brake, which gives the engine braking together with the friction element 5d that is a part of the forward friction element when the operation position of the selection bar 30 is in the L range. When the operation position of the selection bar 30 is in the R range, the friction element 5a operates with the backward friction element 5e. The friction element 5a may be called as a braking friction element.

The electromagnetic valves 35b, 35c, 35d are arranged corresponding to the forward friction elements 5b, 5c, 5d. One of the forward friction elements 5b, 5c, 5d is operated to engage based on the forward shift positions. The electromagnetic valve 35e is arranged corresponding to the backward friction element 5e, and the electromagnetic valve 35a is arranged corresponding to the braking friction element 5a. Namely, the electromagnetic valves 35a-35e are arranged relative to the friction elements 5a-5e, respectively, through supply oil passages 40a-40e.

Figure 2:
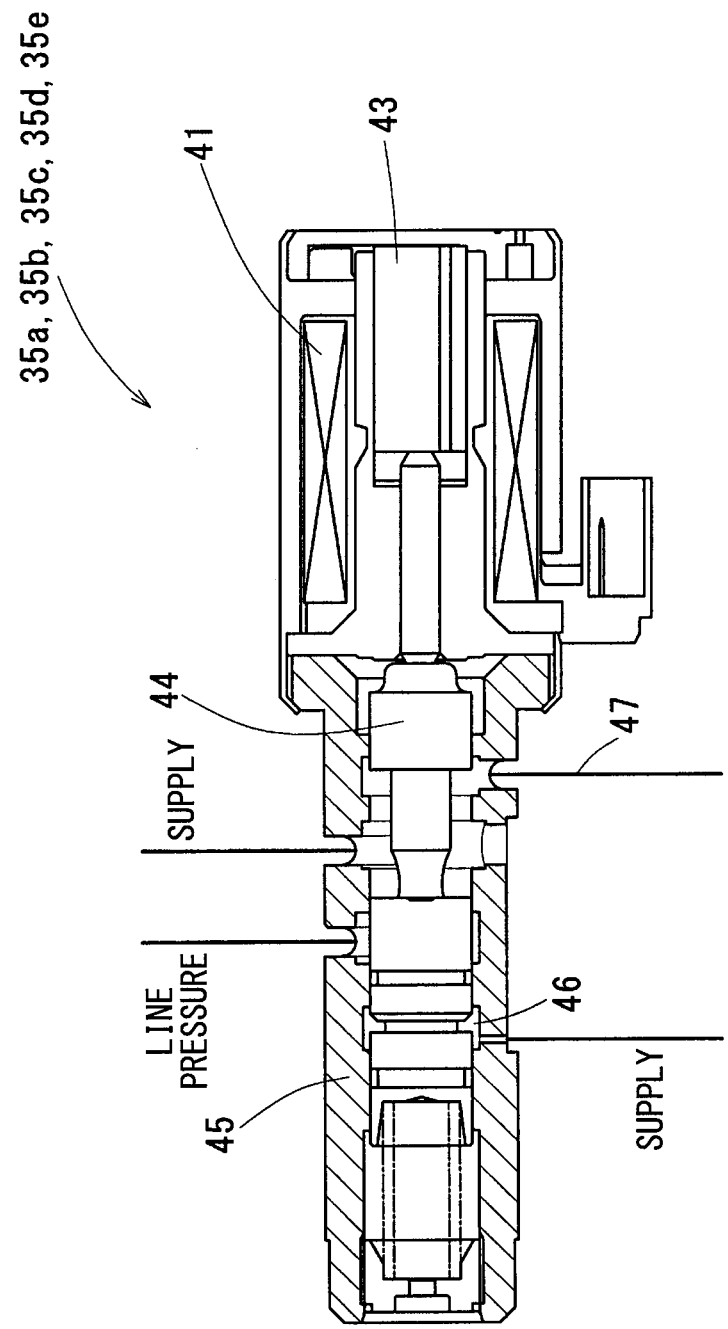
FIG. 2 is a view illustrating an electromagnetic valve of the oil pressure control device in the embodiment.

The electromagnetic valve 35a-35e is explained with reference to FIG. 2. The electromagnetic valve 35a-35e is a normally-closed oil pressure control valve having a spool valve in which the output oil pressure can be changed continuously. The electromagnetic valve 35a-35e has a movable object 43, a spool 44 driven with the movable object 43, and a sleeve 45 which holds the spool 44 to be slideable. The movable object 43 is made of a magnetic body driven by the magnetic flux generated by energizing a coil 41. The line pressure which is the oil pressure generated by the oil pressure supplying device 1a is controlled to have the supply pressure by reciprocation of the spool 44, and is outputted to the friction element 5a-5e. FIG. 2 illustrates a fully closed state at a time of not energizing.

The electromagnetic valve 35a-35e controls the supply pressure which is output oil pressure based on a balance among an electromagnetic force according to the instruction value of the current, an oil pressure introduced into a feedback chamber 46 from the output oil pressure, and a biasing force of a spring. The oil pressure introduced into the feedback chamber 46 provides a feedback force to the spool 44 to restrict change in the supply pressure.

The electromagnetic valve 35a-35e can adjust the line pressure which is a pressure of operation oil supplied via the forward oil passage 32 or the backward oil passage 33 directly from the oil passage 16 or from the manual valve 14, and can supply the line pressure to the friction element 5a-5e. The amount of torque transmitted between the first engagement board 6a and the second engagement board 6b is controlled by controlling the supply pressure from the electromagnetic valve 35a-35e.

Figure 3:
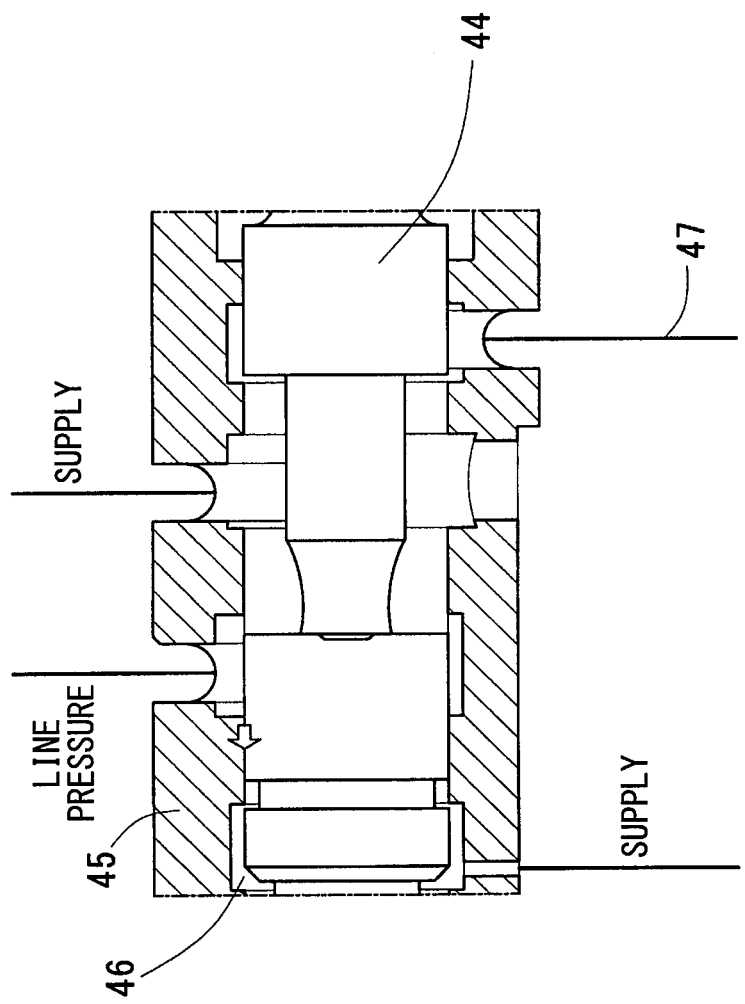
FIG. 3 is a view illustrating the electromagnetic valve that is opened.

As shown in FIG. 3, the electromagnetic valve 35a-35e connects the supply oil passage 40a-40e to the oil passage to which the line pressure is given at a valve open time, such that the supply pressure is outputted to the friction element 5a-5e.

When the electromagnetic valve 35a-35e is not fully opened, the supply pressure is set lower than the line pressure, since a part of the operation oil is discharged to a drain oil passage 47. Thereby, the supply pressure supplied to the feedback chamber 46 that is connected with the supply oil passage 40a-40e is also lower than the line pressure. In other words, the line pressure is larger than the supply pressure that is an oil pressure of the feedback chamber 46. For this reason, the operation oil flows to the feedback chamber 46 through a clearance between the spool 44 and the sleeve 45 (refer to a blank arrow in FIG. 3), due to a difference between the line pressure and the supply pressure. If a foreign substance accumulates in the clearance between the spool 44 and the sleeve 45, the foreign substance may affect the spool 44 and the sleeve 45.

When the electromagnetic valve 35a-35e is fully closed, as shown in FIG. 2, since the supply oil passage 40a-40e is connected only to the drain oil passage 47, the feedback chamber 46 has a drain pressure (atmospheric pressure) lower than the line pressure. Due to the difference between the line pressure and the drain pressure, operation oil flows through the clearance between the spool 44 and the sleeve 45 to the feedback chamber 46 and a space connected to the supply oil passage 40a-40e. At this time, a foreign substance may easily stay in the clearance between the spool 44 and the sleeve 45. The accumulation amount of foreign substance is larger when the spool 44 stops, compared with a case where the spool 44 is moving.

As shown in FIG. 1, TCU 50 which controls the electromagnetic valves 35a-35e includes a supply pressure instruction portion 50a, a current instruction portion 50b, and a driver 50c which drives the electromagnetic valves 35a-35e. In the automatic shift 2, when the friction element 5a-5e is operated, the supply pressure is changed according to a predetermined pattern. The supply pressure instruction portion 50a computes the instruction value of the supply pressure for the friction element 5a-5e based on the predetermined pattern. The current instruction portion 50b computes the instruction value of the current sent through the coil 41 by applying the instruction value of the supply pressure to the current instruction characteristic, and outputs a control signal indicating the instruction value of the current.

The driver 50c makes current to flow through the coil 41 by inputting a control signal, and has an electric circuit containing a switching element. The electromagnetic valve 35a-35e is provided with a real current corresponding to the instruction value of the current from the current instruction portion 50b. The driver 50c supports each of the electromagnetic valves 35a-35e. The TCU 50 can give the instruction values of the current different from each other to the respective drivers 50c, i.e., the respective electromagnetic valves 35a-35e, to have the different current values.

The current instruction characteristic is a correlation between the instruction value of current given to each driver 50c and the instruction value of oil pressure, and is obtained for each friction element 5a-5e. The current instruction characteristic in an initial state is made using the average value of the detected supply pressures after detecting the instruction value of the current given to the driver 50c and the supply pressure given to the friction element.

Figure 4:
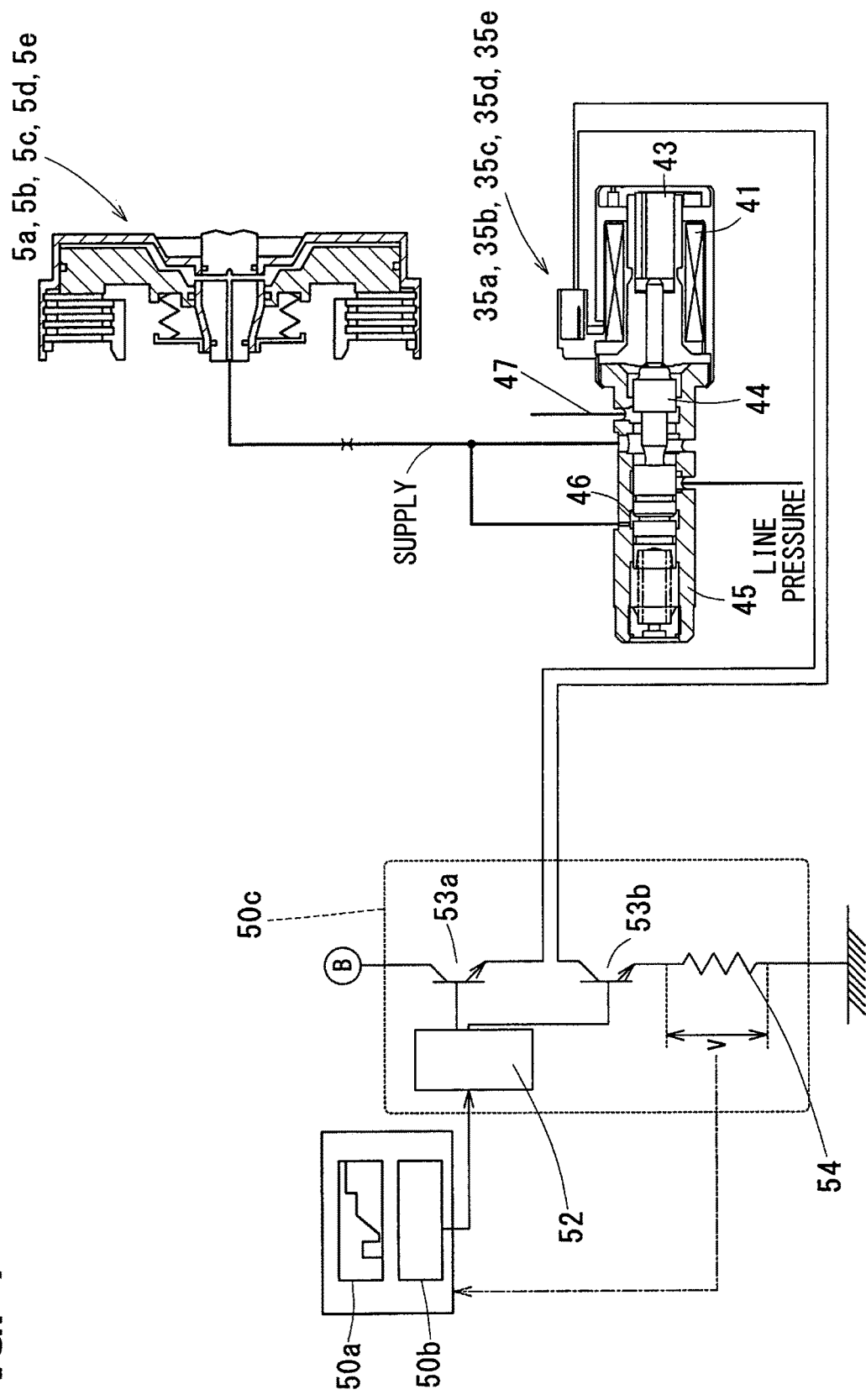
FIG. 4 is a view illustrating a driver of the oil pressure control device in the embodiment.

As shown in FIG. 4, the driver 50c has CPU 52, a switching element 53a, a switching element 53b, and a detection resistor 54. The CPU 52 is a control part which controls the energizing amount to the electromagnetic valve 35a-35e by referring to the instruction value of current that is based on the instruction value of supply pressure. The detection resistor 54 is a current detector which detects the current flowing through a switching element 53a, a switching element 53b, and the coil 41. A collector terminal of the switching element 53a is connected to a battery, and an emitter terminal of the switching element 53a is connected to an end of the coil 41. A collector terminal of the switching element 53b is connected to the other end of the coil 41, and an emitter terminal of the switching element 53b is grounded through the detection resistor 54.

When the control signal given from the current instruction portion 50b to CPU 52 is only an instruction value of current, CPU 52 controls the energizing amount to the coil 41 by continuously controlling the switching element 53b ON and by carrying out PWM control of the switching element 53a with the control signal from CPU 52. In addition, the energizing amount is controlled to realize the instruction value of current by acquiring the detection value of the current which flows through the detection resistor 54 as a voltage value V between the ends of the detection resistor 54.

When the control signal given from the current instruction portion 50b to CPU 52 includes a first frequency and a first current amplitude in addition to the instruction value of current, CPU 52 computes a second frequency higher than the first frequency so as to form a first waveform that realizes the continuous ON control of the switching element 53b, the first frequency and the first current amplitude for the switching element 53a. Further, CPU 52 controls the energizing amount to the coil 41 by controlling the switching element 53a with the cycle of the second frequency.

Figure 5:
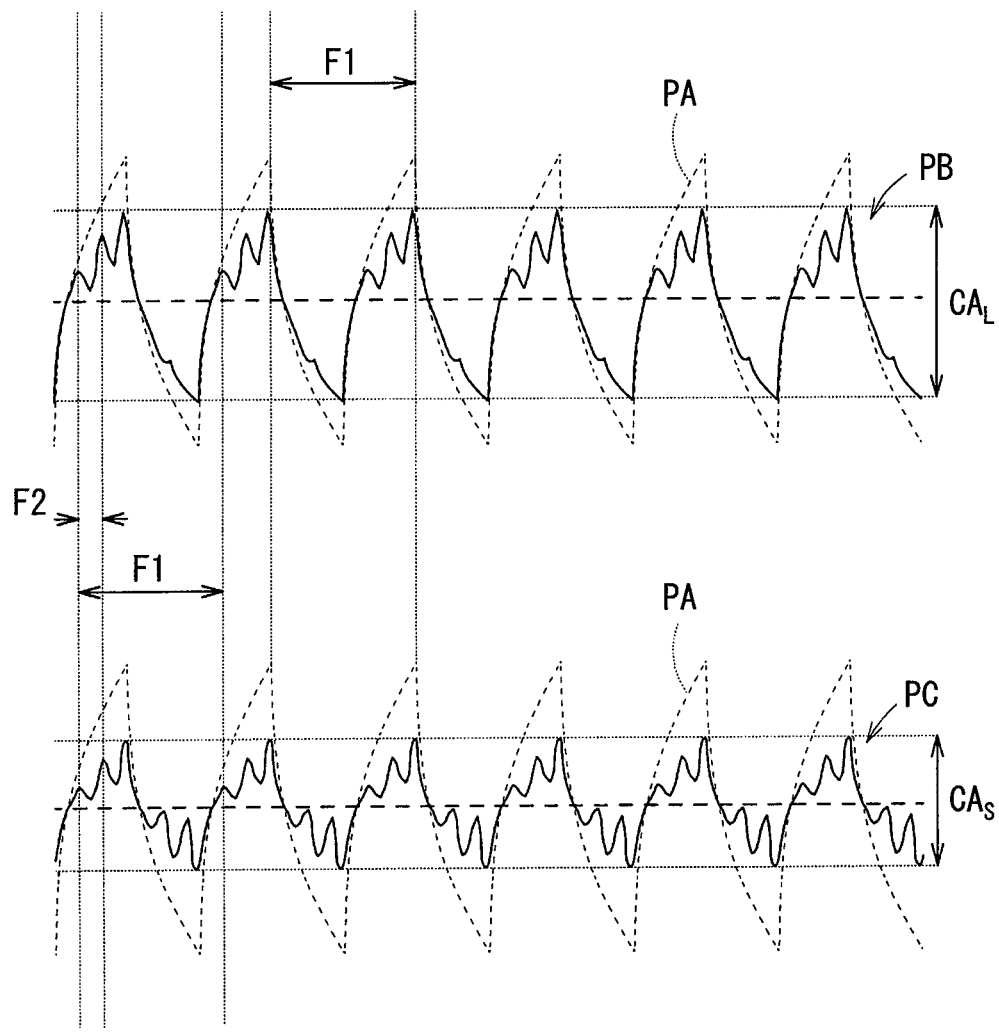
FIG. 5 is a view illustrating a first oscillatory wave part in the embodiment.

That is, CPU 52 controls the switching element 53a by controlling the duty ratio in one cycle of the second frequency to realize the first current amplitude. This means that, as shown in FIG. 5, relative to the same first frequency F1, it is possible to control the first current amplitude. For example, the first current amplitude $CA_L$ on the upper side in FIG. 5 is larger than the first current amplitude CAs on the lower side in FIG. 5. The waveforms shown in FIG. 5 are schematic waveforms actually measured, and are not waveforms of the theoretical value.

Figure 7:
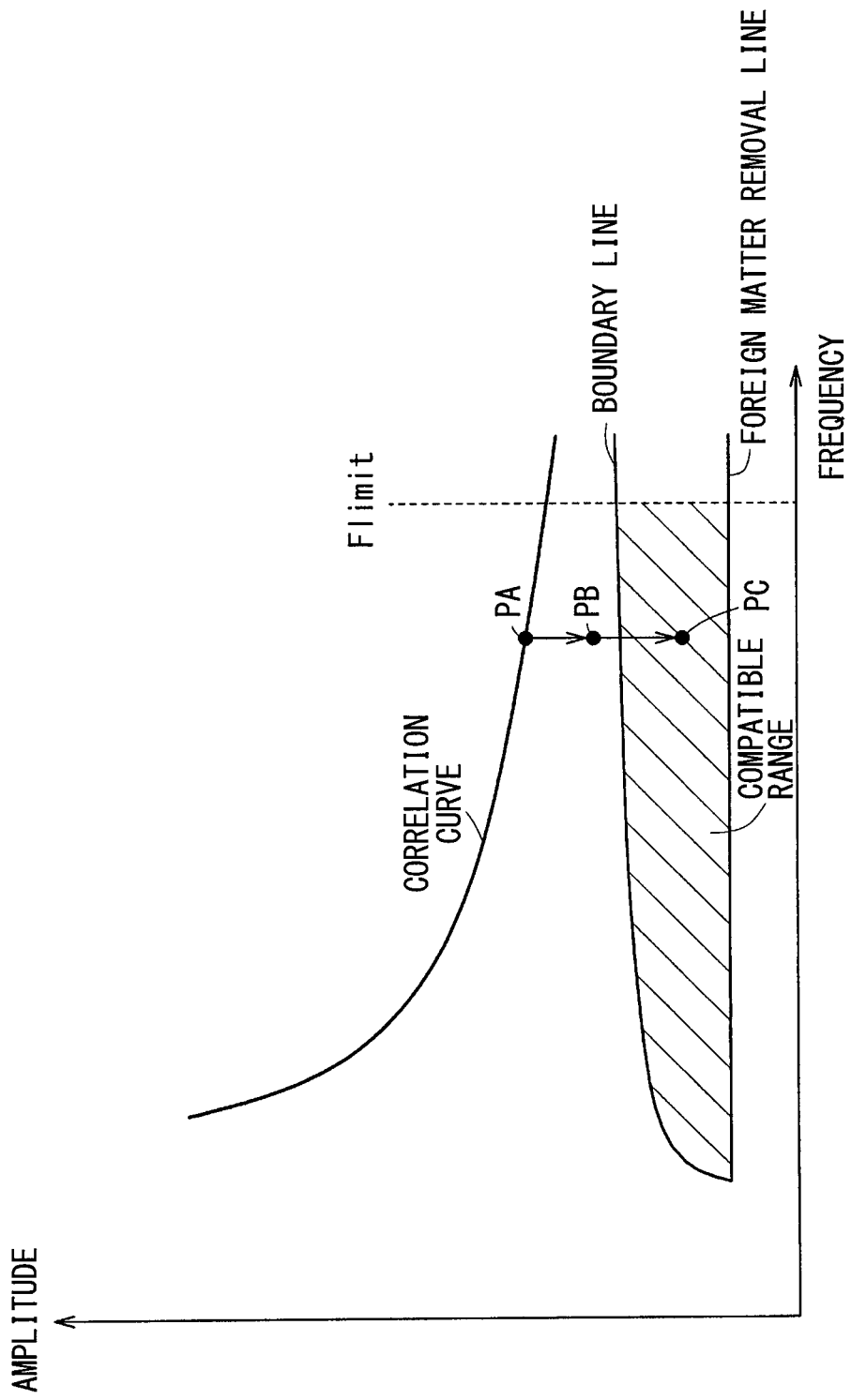
FIG. 7 is a graph illustrating a relationship between a frequency and an amplitude of a spool of the electromagnetic valve in the embodiment.

Specifically, in FIG. 5, the original waveform PA is expressed with a dashed line, which is a waveform showing the energizing current amplitude relative to the first frequency on a correlation curve (see FIG. 7). The energizing amount is reduced with the cycle of the second frequency F2 from the original waveform PA. When the reduced amount is smaller, the first current amplitude $CA_L$ becomes large (refer to the upper waveform in FIG. 5). When the reduced amount is larger, the first current amplitude CAs becomes small (refer to the lower waveform in FIG. 5). That is, a first oscillatory wave part PB, PC can be formed by superimposing a second waveform on the original waveform PA vibrating with the first frequency (refer to PA, PB and PC in FIG. 7.). The second waveform is formed by controlling the energizing amount to the electromagnetic valve with the cycle of the second frequency F2 higher than the first frequency F1.

Therefore, in case where the control signal output from the current instruction portion 50b to CPU 52 includes the first frequency and the first current amplitude in addition to the instruction value of current, the first oscillatory wave part is presented. Specifically, the energizing amount to the electromagnetic valves 35a-35e is controlled by superimposing the second waveform with the second frequency higher than the first frequency on the first waveform with the first frequency. Due to the first oscillatory wave part, the spool 44 reciprocates with the first frequency and the first reciprocation amplitude.

Figure 6:
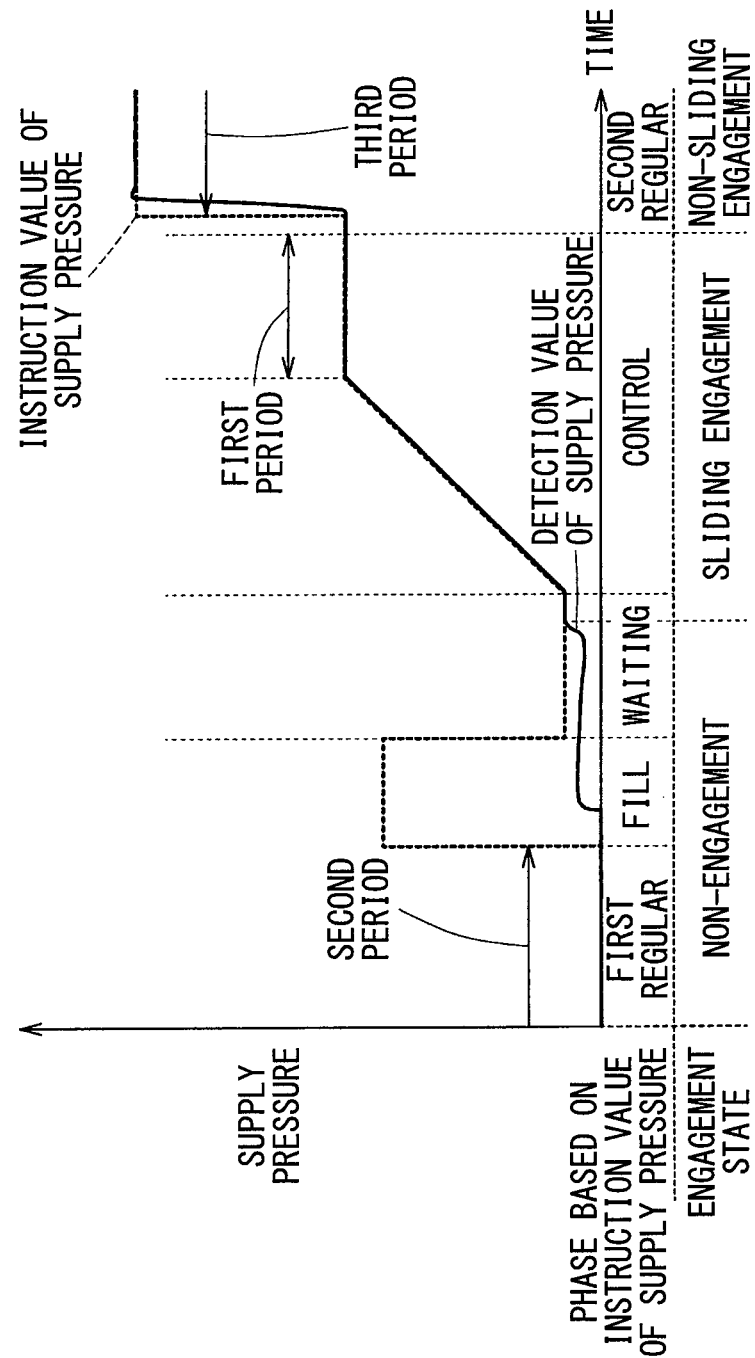
FIG. 6 is a view illustrating first, second and third periods during which an instruction value of supply pressure is kept constant in the embodiment.

FIG. 6 is a time chart illustrating an instruction value of supply pressure. The case in which the control signal output from the current instruction portion 50b to CPU 52 includes the first frequency and the first current amplitude in addition to the instruction value of current is described with reference to FIG. 6. In FIG. 6, a solid line shows an actual supply pressure, and a dashed line shows an instruction value of supply pressure, while the friction element 5a-5e shifts from the non-engagement state to the non-sliding engagement state through the sliding engagement state. The dashed line of FIG. 6 representing a time change waveform in the instruction value of the supply pressure has a first regular phase, a fill phase, a waiting phase, a control phase, and a second regular phase in this order.

In the first regular phase, the instruction value of supply pressure is maintained to a lower limit value. In the fill phase, a surge pressure is temporarily filled to obtain a rise in the waveform within a predetermined period. In the waiting phase, the instruction value of supply pressure is maintained to a value lower than the surge pressure during a period after the fill phase before the supply pressure is raised. In the control phase, the pressure increase is controlled by the electromagnetic valve while the waveform is raised. In the second regular phase, the instruction value of supply pressure is maintained to an upper limit value after shifting to the non-sliding engagement state.

The solid line of FIG. 6 representing the actual time change value (detection value) in the supply pressures is acquired by an oil pressure sensor disposed in the supply oil passage 40a-40e in an experimental bench.

At the boundary between the control phase and the second regular phase, i.e., the boundary of the sliding engagement state and the non-sliding engagement state, the first engagement board 6a and the second engagement board 6b shift from the sliding engagement state to the non-sliding engagement state. In this embodiment, the boundary is determined based on change in output torque. Alternatively, the boundary may be determined based on a rotation speed of the turbine.

The boundary point between the non-engagement state and the sliding engagement state is defined by a timing where the detection value of supply pressure exceeds a predetermined value.

In the friction element 5a-5e, the piston 8 is driven in response to the increase in the supply pressure, and contacts the first engagement board 6a. Further, when the piston 8 presses the first engagement board 6a, the first engagement board 6a and the second engagement board 6b are engaged with each other. For this reason, the boundary point between the non-engagement state and the sliding engagement state corresponds to a movement completing point of the piston 8, such that a backlash state between the piston 8 and the first engagement board 6a is completely defined. The boundary point between the non-engagement state and the sliding engagement state is located at a middle of the waiting phase that is defined based on the instruction value of supply pressure.

The boundary point between the non-engagement state and the sliding engagement state may be set by directly detecting the detection value of supply pressure. Alternatively, the boundary point between the non-engagement state and the sliding engagement state may be set by detecting the movement completing point of the piston 8, or the lapsed time after shifting to the waiting phase.

In a first period during which the sliding engagement state and the instruction value of supply pressure are kept constant, the control signal from the current instruction portion 50b to the CPU 52 includes the first frequency and the first current amplitude in addition to the instruction value of current. Namely, in the first period where the sliding engagement state and the instruction value of supply pressure are kept constant, the time change waveform of the energizing amount to the electromagnetic valve 35a-35e is controlled by the first oscillatory wave part, that is formed by CPU 52 by superimposing the second waveform with the second frequency upon the first waveform that vibrates on the first frequency. The second waveform is defined by controlling the energizing amount to the electromagnetic valve 35a-35e with the cycle of the second frequency higher than the first frequency. Due to the first oscillatory wave part, the spool 44 reciprocates with the first frequency and the first reciprocation amplitude. In addition, the instruction value of the supply pressure in the first period is a supply pressure which can realize the non-sliding engagement state. The fluctuation width of the output torque can be controlled by adjusting the instruction value and the period of this supply pressure.

The time change waveform of the energizing amount to the electromagnetic valve 35a-35e may be the first oscillatory wave part in all the first period, or in a part of the first period. Here, the first frequency and the first reciprocation amplitude are obtained based on the mass of the piston 8, the spring constant of the return spring 9, and the volume of the oil pressure chamber 7.

More specifically, for example by measuring in an experimental bench, it is determined whether the reciprocation frequency and the reciprocation amplitude of the spool 44 are in a compatible range (see FIG. 7) as variables. The reciprocation frequency and the reciprocation amplitude in the compatible range are set as the first frequency and the first reciprocation amplitude. Since it is experimentally known that the compatible range depends on the mass of the piston 8, the spring constant of the return spring 9, and the volume of the oil pressure chamber 7, the first frequency and the first reciprocation amplitude are also obtained based on these values. The supply pressure is less affected by the reciprocation of the spool 44, as the mass of the piston 8 is larger, as the spring constant of the return spring 9 is larger, or as the volume of the oil pressure chamber 7 is larger.

CPU 52 defines a second oscillatory wave part in which the energizing amount to the electromagnetic valve 35a-35e is controlled by superimposing a fourth waveform with a fourth frequency higher than a third frequency on a third waveform with the third frequency during a second period (see FIG. 6) while the non-engagement state and the instruction value of the supply pressure are kept constant. The second oscillatory wave part controls the spool 44 to reciprocate with the third frequency. The second oscillatory wave part controls the supply pressure not to exceed a start pressure of the sliding engagement state at which the non-engagement state shifts to the sliding engagement state.

The time-change waveform of the energizing amount to the electromagnetic valve 35a-35e may not be the second oscillatory wave part entirely in the second period. The second oscillatory wave part may be defined in a part of the second period. In the embodiment, the period of the first regular phase where the lower limit value is provided as the instruction value of supply pressure corresponds to the second period.

The start pressure of the sliding engagement state is obtained based on the mass of the piston 8, the spring constant of the return spring 9, and the volume of the oil pressure chamber 7. Specifically, the start pressure of the sliding engagement state can be computed based on the supply amount of operation oil supplied to the oil pressure chamber 7, the mass of the piston 8, and the spring constant of the return spring 9. A relation of the supply amount of operation oil to the oil pressure chamber 7 and the instruction value of supply pressure when the line pressure is regular is acquirable beforehand by experiments.

CPU 52 defines a third oscillatory wave part in which the energizing amount to the electromagnetic valve 35a-35e is controlled by superimposing a sixth waveform with a sixth frequency higher than a fifth frequency on a fifth waveform with the fifth frequency during a third period while the non-sliding engagement state and the instruction value of the supply pressure are kept constant. The third oscillatory wave part controls the spool 44 to reciprocate with the fifth frequency. The third oscillatory wave part controls the supply pressure not to be lower than a start pressure of the sliding engagement state at which the non-sliding engagement state shifts to the sliding engagement state.

The time change waveform of the energizing amount to the electromagnetic valve 35a-35e may be the third oscillatory wave part in all of the third period or a part of the third period. In the embodiment, the upper limit value is provided as an instruction value of supply pressure in the third period. The start pressure of the sliding engagement state is obtained based on the mass of the piston 8, the spring constant of the return spring 9, and the volume of the oil pressure chamber 7.

More specifically, the start pressure of the sliding engagement state can be computed based on the discharge amount of operation oil discharged from the oil pressure chamber 7, the mass of the piston 8, and the spring constant of the return spring 9. The relation between the discharge amount of operation oil discharged from the oil pressure chamber 7 and the instruction value of supply pressure when the drain pressure is regular is acquirable beforehand by experiments.

In the embodiment, the first frequency of the first oscillatory wave part, the third frequency of the second oscillatory wave part, and the fifth frequency of the third oscillatory wave part are the same frequency. In the embodiment, the supply pressure can be given to the friction element 5a-5e by the electric pump 12 not only when the internal-combustion engine operates but when the internal-combustion engine is in the idling stop state. Therefore, the second period is set in the idling stop state.

According to the embodiment, CPU 52 defines the first oscillatory wave part in which the energizing amount to the electromagnetic valve 35a-35e is controlled by superimposing the second waveform with the second frequency higher than the first frequency on the first waveform with the first frequency during the first period while the sliding engagement state and the instruction value of the supply pressure are kept constant. The first oscillatory wave part controls the spool 44 to reciprocate with the first frequency and the first amplitude which are flexibly changeable according to a driving condition of the vehicle during the first period while the sliding engagement state and the instruction value of the supply pressure are kept constant.

Thereby, the first waveform can determine the reciprocation frequency of the spool 44, and the second waveform can control the energizing amplitude of the electromagnetic valve 35a-35e, i.e., the reciprocation amplitude of the spool 44. For this reason, the selection flexibility can be raised in the reciprocation amplitude of the spool 44 relative to the reciprocation frequency of the spool 44. Thus, in the oil pressure control device 1, the reciprocation frequency and the reciprocation amplitude of the spool 44 can be set in the wide selection range. As a result, the reciprocation amplitude of the spool 44 and the reciprocation frequency of the spool 44 can be flexibly combined in the range which does not affect the supply pressure. Therefore, a foreign substance can be removed effectively while restricting the supply pressure from being varied.

Specifically, as shown in FIG. 7, the reciprocation amplitude lower than the correlation curve can be used in addition to a reciprocation frequency and a reciprocation amplitude on the correlation curve. In FIG. 7, a boundary line is shown as a boundary allowing a reciprocation amplitude relative to a reciprocation frequency of the spool 44. That is, the boundary line represents an allowable range of supply pressure relative to a reciprocation of the spool 44. The boundary line is a curve which increases simply as the reciprocation frequency of the spool 44 increases. On the upper side of the boundary line, the supply pressure becomes out of the allowable range due to the reciprocation of the spool 44. On the lower side of the boundary line, the supply pressure is within the allowable range due to the reciprocation of the spool 44. The allowable range is set as a range in which a shift shock is not generated, in a manner that a variation in the supply pressure caused by the reciprocation of the spool 44 is within, for example, about tens kilopascals (kPa).

Moreover, a foreign matter removal line in FIG. 7 shows a reciprocation amplitude of the spool 44 required for removing a foreign substance. On the upper side of the foreign matter removal line, a foreign substance removal is possible. On the lower side of the foreign matter removal line, a foreign substance removal is not possible.

In FIG. 7, the compatible range is defined between the boundary line and the foreign matter removable line. In the compatible range on the upper side of the foreign matter removal line and the lower side of the boundary line, a foreign substance can be removed while the change in supply pressure caused by reciprocation of the spool 44 is made within the allowable range.

The reciprocation of the spool 44 has a limit frequency Flimit shown in FIG. 7. The spool cannot reciprocate at frequencies higher than the limit frequency Flimit.

Therefore, if the combination of the reciprocation frequency and the reciprocation amplitude of the spool 44 on the correlation curve is out of the compatible range, the reciprocation frequency and the reciprocation amplitude of the spool 44 can be made into the compatible range by controlling the reciprocation amplitude, i.e., the amplitude of the energizing current.

Figure 8:
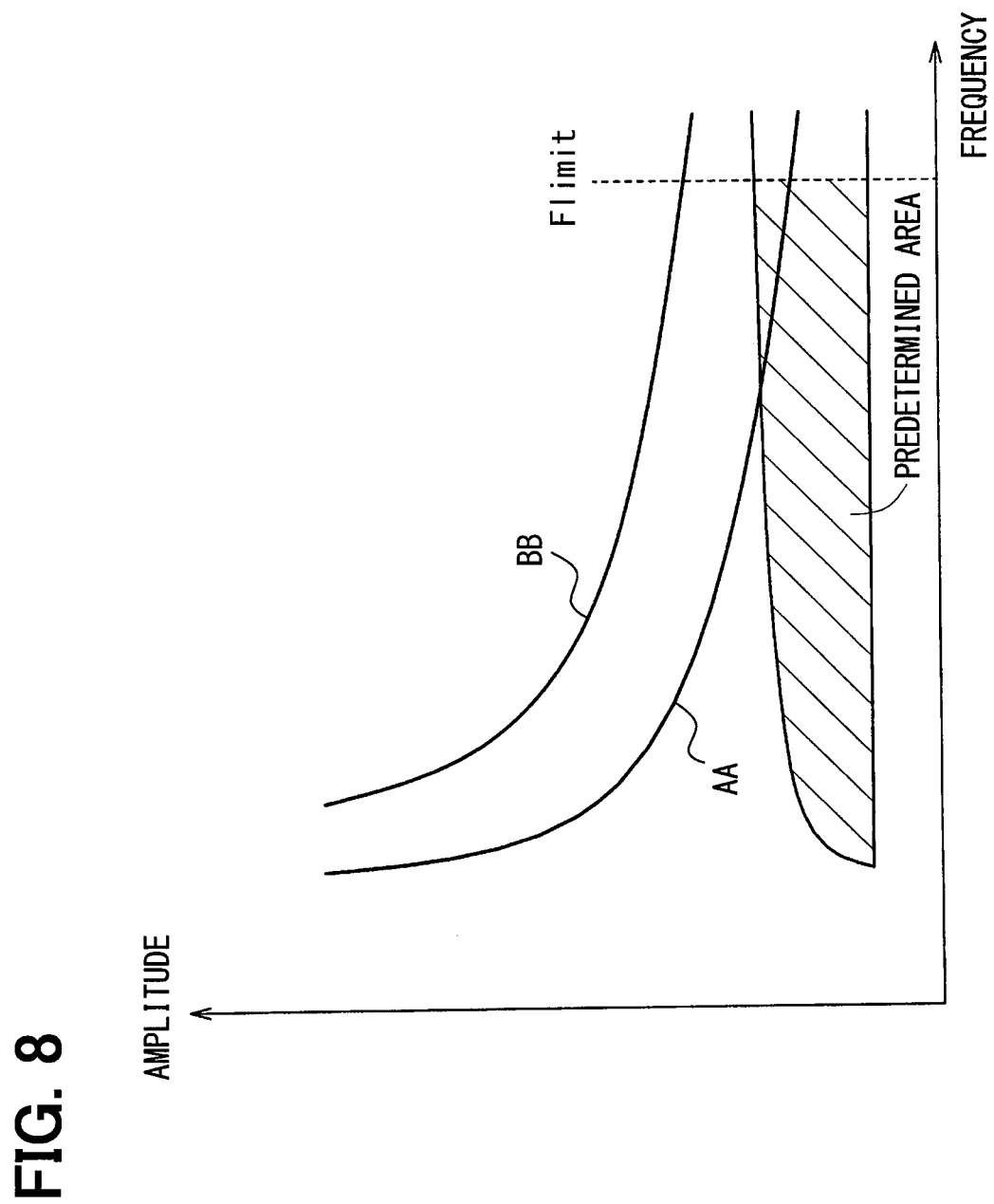
FIG. 8 is a graph illustrating a relationship between a frequency and an amplitude of a spool in a comparison example.

A comparison example is explained with reference to FIG. 8. It is necessary to promptly remove a foreign substance while the internal-combustion engine operates. The change of supply pressure is restricted by making the spool to reciprocate on higher frequency.

However, when the spool is made to reciprocate on higher frequency while the electromagnetic valve is energized with a predetermined energizing amount, there is a limit in the rising edge of the energizing amount of the electromagnetic valve. The amplitude of the energizing amount corresponding to the higher frequency will be determined compulsorily, and the reciprocation amplitude of the spool will also be determined compulsorily relative to the amplitude of the energizing amount. Therefore, in the comparison example, as shown in FIG. 8, only the combination values on the correlation curve AA are able to be used. When the value of the predetermined energizing amount is different, only the combination values on the correlation curve BB are able to be used.

For this reason, in the case of the correlation curve BB of the comparison example, any combination values on the correlation curve BB cannot be used depending on the energizing amount to the electromagnetic valve, because the correlation curve BB does not overlap with a compatible range (predetermined area) where a foreign substance can be removed while a variation of supply pressure can be restricted within an allowable level.

In the oil pressure control device 1 of the embodiment, the first frequency and the first reciprocation amplitude are obtained based on the mass of the piston 8, the spring constant of the return spring 9, and the volume of the oil pressure chamber 7. Thereby, the first frequency and the first reciprocation amplitude can be set according to the friction element 5a-5e. In the embodiment, the friction elements 5a-5e have the same form, and the compatible range is defined by the first frequency of 50-200 Hz and the energizing current amplitude less than or equal to 400 mA. When the second frequency is in the range of 1000-2000 Hz, the spool 44 does not follow the frequency of the varied energizing current, such that a good controllability is obtained.

CPU 52 defines a second oscillatory wave part in which the energizing amount to the electromagnetic valve 35a-35e is controlled by superimposing a third waveform with a third frequency on a fourth waveform with a fourth frequency higher than the third frequency during a second period while the non-engagement state and the instruction value of the supply pressure are kept constant. The second oscillatory wave part controls the spool 44 to reciprocate with the third frequency, and the second oscillatory wave part controls the supply pressure not to exceed the start pressure of the sliding engagement state at which the non-engagement state shifts to the sliding engagement state.

Thereby, the third waveform can determine the reciprocation frequency of the spool 44, and the fourth waveform can control the amplitude of the energizing current to the electromagnetic valve 35a-35e, i.e., the reciprocation amplitude of the spool 44. For this reason, the selection flexibility can be raised in the reciprocation amplitude of the spool 44 relative to the reciprocation frequency of the spool 44. Thus, the reciprocation frequency and the reciprocation amplitude of the spool 44 can be set in the wide selection range.

Therefore, in the second period where the non-engagement state and the instruction value of the supply pressure are kept constant, e.g., under the first regular phase, even if the combination of the reciprocation frequency and the reciprocation amplitude of the spool 44 on a correlation curve is out of the compatible range, the reciprocation frequency and the reciprocation amplitude of the spool 44 can be made into the compatible range by controlling the reciprocation amplitude, i.e., the amplitude of the energizing current. Since the supply pressure does not exceed the start pressure of the sliding engagement state due to the second oscillatory wave part, a shift shock (vibration) can be restricted from being generated. In addition, there is a period where the instruction value of supply pressure is kept constant in the fill phase and the waiting phase under the non-engagement state, but the period is very short. It is not realistic to control the energizing amount to have the second oscillatory wave part in this period.

In the oil pressure control device 1 of the embodiment, the start pressure of the sliding engagement state is obtained based on the mass of the piston 8, the spring constant of the return spring 9, and the volume of the oil pressure chamber 7. Thereby, the start pressure of the sliding engagement state can be set according to the friction element 5a-5e. In the embodiment, the friction elements 5a-5e have the same form, and the start pressure of the sliding engagement state is set as, for example, 80 kPa.

CPU 52 defines a third oscillatory wave part in which the energizing amount to the electromagnetic valve 35*a*-35*e* is controlled by superimposing a fifth waveform with a fifth frequency on a sixth waveform with a sixth frequency higher than the fifth frequency during a third period while the non-sliding engagement state and the instruction value of the supply pressure are kept constant. The third oscillatory wave part controls the spool 44 to reciprocate with the fifth frequency. The third oscillatory wave part controls the supply pressure not to be lower than the start pressure of the sliding engagement state where the non-sliding engagement state shifts to the sliding engagement state.

Thereby, the fifth waveform can determine the reciprocation frequency of the spool 44, and the sixth waveform can control the amplitude of the energizing current to the electromagnetic valve 35*a*-35*e*, i.e., the reciprocation amplitude of the spool 44. For this reason, the selection flexibility of the reciprocation amplitude of the spool 44 to the reciprocation frequency of the spool 44 can be raised. Thus, in the oil pressure control device 1, the reciprocation frequency and the reciprocation amplitude of the spool 44 can be set in the wide selection range.

Therefore, in the third period where the non-sliding engagement state and the instruction value of supply pressure are kept constant, even if the combination of the reciprocation frequency and the reciprocation amplitude of the spool 44 on a correlation curve is out of the compatible range, the reciprocation frequency and the reciprocation amplitude of the spool 44 can be made into the compatible range by controlling the reciprocation amplitude, i.e., the amplitude of the energizing current. Since the supply pressure does not become lower than the start pressure of the sliding engagement state by the third oscillatory wave part, a shift shock (vibration) can be restricted from being generated. In addition, there is a period where the instruction value of supply pressure is kept constant between an upper limit and a lower limit, except the third period, under the non-sliding engagement state, but this period is very short. It is not realistic to control the energizing amount to have the third oscillatory wave part in this period.

In the oil pressure control device 1 of the embodiment, the start pressure of the sliding engagement state is obtained based on the mass of the piston 8, the spring constant of the return spring 9, and the volume of the oil pressure chamber 7. Thereby, the start pressure of the sliding engagement state can be set according to the friction element 5*a*-5*e*. In this embodiment, the friction elements 5*a*-5*e* have the same form, and the start pressure of the sliding engagement state is the same among the friction elements 5*a*-5*e*.

In the embodiment, the first frequency of the first oscillatory wave part, the third frequency of the second oscillatory wave part, and the fifth frequency of the third oscillatory wave part are the same frequency. For this reason, storage capacity of a memory can be reduced since the same frequency is set for the first period, the second period, and the third period. Alternatively, the first frequency of the first oscillatory wave part, the third frequency of the second oscillatory wave part, and the fifth frequency of the third oscillatory wave part may be different from each other.

In this embodiment, the second period can also be set in the idling stop operation. Thereby, a foreign substance can be restricted from accumulating to the spool 44 even when the vehicle is frequently in the idling stop state due to traffic congestion, while it is not necessary to care about a shift shock in the idling stop state. The present disclosure can be applied to a vehicle not having an idling stop system.

Such changes and modifications are to be understood as being within the scope of the present disclosure as defined by the appended claims.

What is claimed is:

1. An oil pressure control device that controls a supply pressure of oil supplied to an oil pressure chamber of a friction element of an automatic shift for a vehicle, the friction element having
   a piston that defines the oil pressure chamber and that is able to move by the supply pressure,
   a return spring that presses the piston against the supply pressure, and
   a first engagement board and a second engagement board engaged with or disengaged from each other by the piston between a non-engagement state and a non-sliding engagement state via a sliding engagement state, the oil pressure control device comprising:
   an electromagnetic valve that controls the supply pressure using a spool which reciprocates according to an energizing amount; and
   a control part that controls the energizing amount based on an instruction value of the supply pressure,
   wherein the control part defines a first oscillatory wave part in which the energizing amount is controlled by superimposing a first waveform with a first frequency on a second waveform with a second frequency higher than the first frequency during a first period while in the sliding engagement state and
   an instruction value of the supply pressure are kept constant, and
   the first oscillatory wave part controls the spool to reciprocate with the first frequency and a first amplitude which are changeable according to a driving condition of the vehicle during the first period while in the sliding engagement state and the instruction value of the supply pressure are kept constant.

2. The oil pressure control device according to claim 1, wherein
   the first frequency and the first amplitude are obtained based on a mass of the piston, a spring constant of the return spring, and a volume of the oil pressure chamber.

3. The oil pressure control device according to claim 1, wherein
   the control part defines a second oscillatory wave part in which the energizing amount is controlled by superimposing a third waveform with a third frequency on a fourth waveform with a fourth frequency higher than the third frequency during a second period while the non-engagement state and an instruction value of the supply pressure are kept constant,
   the second oscillatory wave part controls the spool to reciprocate with the third frequency, and
   the second oscillatory wave part controls the supply pressure not to exceed a start pressure of the sliding engagement state.

4. The oil pressure control device according to claim 3, wherein
   the start pressure of the sliding engagement state is obtained based on a mass of the piston, a spring constant of the return spring, and a volume of the oil pressure chamber.

5. The oil pressure control device according to claim 1, wherein
   the control part defines a third oscillatory wave part in which the energizing amount is controlled by superimposing a fifth waveform with a fifth frequency on a sixth waveform with a sixth frequency higher than the fifth frequency during a third period while the non-sliding engagement state and an instruction value of the supply pressure are kept constant, the third oscillatory wave part controls the spool to reciprocate with the fifth frequency, and the third oscillatory wave part controls the supply pressure not to be lower than a start pressure of the sliding engagement state.

6. The oil pressure control device according to claim 5, wherein the start pressure of the sliding engagement state is obtained based on a mass of the piston, a spring constant of the return spring, and a volume of the oil pressure chamber.

* * * * *